C. C. FORD.
GRADE INDICATOR.
APPLICATION FILED JULY 7, 1919.
1,375,141.
Patented Apr. 19, 1921.
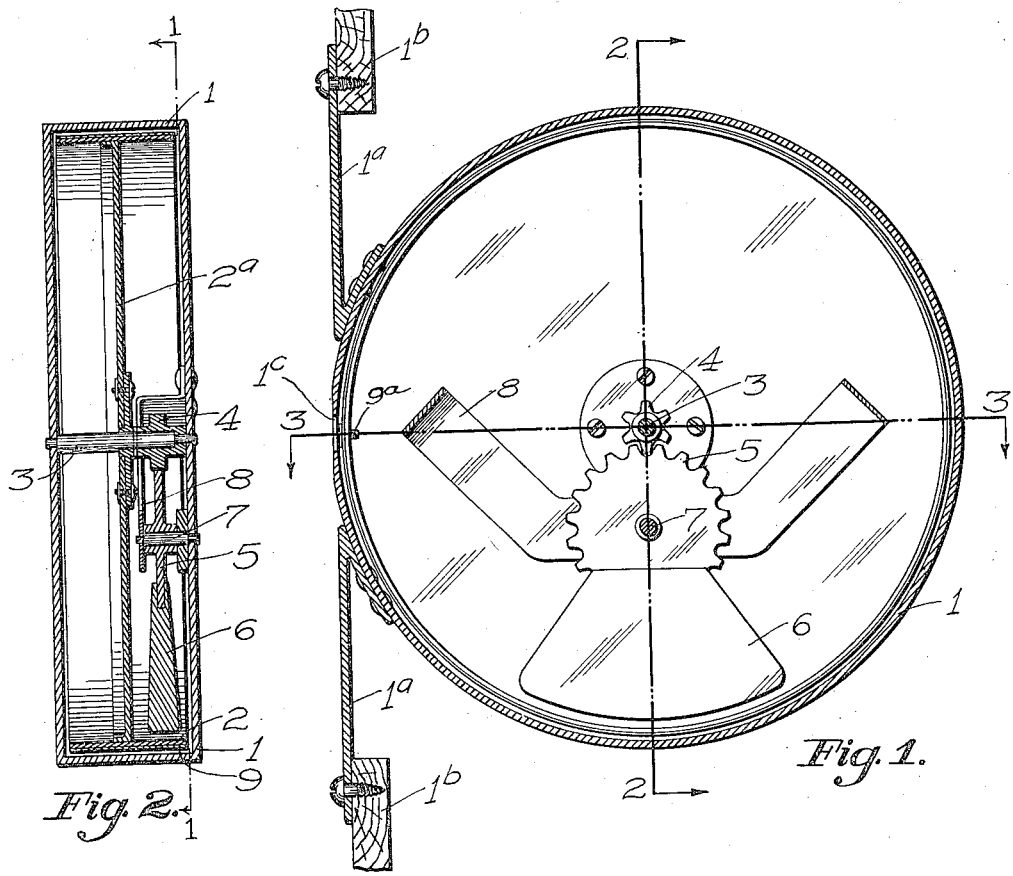
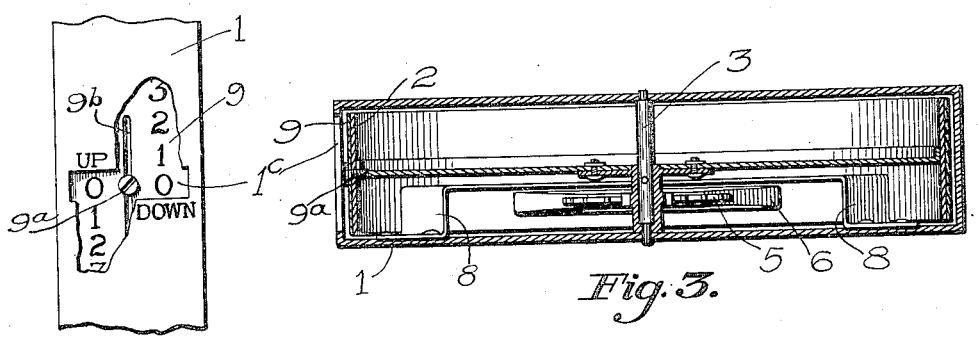
INVENTOR.
Charles C Ford
BY A. B. Bowman
ATTORNEY

UNITED STATES PATENT OFFICE.

CHARLES C. FORD, OF POINT LOMA, CALIFORNIA.

GRADE-INDICATOR.

1,375,141.     Specification of Letters Patent.     Patented Apr. 19, 1921.

Application filed July 7, 1919. Serial No. 309,042.

*To all whom it may concern:*

Be it known that I, CHARLES C. FORD, a citizen of the United States, residing at Point Loma, in the county of San Diego and State of California, have invented a certain new and useful Grade-Indicator, of which the following is a specification.

My invention relates to an indicator for determining the degree of grades or inclinations, more particularly adapted for use in connection with vehicles for determining the grade over which a vehicle is traveling and the objects of my invention are: first, to provide an indicator of this class which is applicable for use in connection with automobiles or other vehicles; second, to provide a device of this class which may be placed upon the instrument board of the automobile and in sight of the driver so that he may readily determine the degree of grade he is ascending or descending and third, to provide a device of this class which is simple and economical of construction, durable, easy to install, easy to read, positive in its action and which will not readily deteriorate or get out of order.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a sectional view through 1—1 of Fig. 2; Fig. 2 is a sectional view through 2—2 of Fig. 1 and showing portions in elevation; Fig. 3 is a sectional view through 3—3 of Fig. 1 and showing portions in elevation and Fig. 4 is a front view of a fragmentary portion of the device showing portions broken away to facilitate the illustration.

Similar characters of reference refer to similar parts and portions throughout the several views of the drawings.

The casing 1, revoluble indicator support 2, shaft 3, pinion 4, gear segment 5, weight 6, weight supporting shaft 7, support 8, and indicator plate 9 constitute the principal parts and portions of my grade indicator.

The casing 1 is cylindrical in form preferably composed of thin sheet metal and it is preferably supported by means of supports 1$^a$ which may be secured to the instrument board 1$^b$ of the vehicle. This casing is provided with a slot 1$^c$ in its front side, and above said slot the word "Up" and below said slot the word "Down" are positioned on the outer surface. Mounted centrally in this casing is the shaft 3 to which is secured the revoluble member 2 by means of a central supporting member 2$^a$ which extends outwardly and its outer edge is secured to the annular revoluble member 2 and revolves with the shaft 3. Mounted on the outer surface of this member 2 are plurality of numerals so positioned as to indicated the degree of grade. On one side the numerals run in one direction and on the other side they run in the opposite direction as shown best in Fig. 4 of the drawings. This indicating plate 9 is secured to the member 2 by means of a screw 9$^a$ mounted in a slot 9$^b$ so that the position of the plate 9 may be moved relatively to the member 2 for adjustment of the plate on various vehicle instrument boards or any place it is desired to place the indicator. Secured to the shaft 3 is a pinion 4. Mounted below said shaft 3 is another shaft 7 supported at the one end by means of the casing 1 and its other end by means of a support 8 which is secured to the inner surface of the casing 1 and extends outwardly and serves as a support for said shaft 7 and so shaped that it does not interfere with the swing of the weight 6 shown best in Fig. 1 of the drawings. Revolubly mounted on this shaft 7 is the gear segment member 5 which engages the pinion 4 and mounted on the normally lower side of this gear segment member 5 is a weight 6 which is the prime mover for the indicator, the weight revolving on the shaft 7 by gravity always maintaining a directly downward position carrying with it the gear 5 which in turn revolves the pinion 4 and revoluble member 2 thus showing through the slot 1$^c$ the degree of grade, the one side indicating the up and the other the down.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction there is provided a gravity actuated device for indicating the grade traveled by a vehicle either up or down, and that it is so constructed that the indicating portion will have sufficient travel so that a slight change in the grade may be readily determined.

Having thus described my invention what I claim as new and desire to secure by Letters Patent, is:

1. A grade indicator, including a casing, a circular indicator member provided with an adjustable band having adjacent scales whose graduations extend in opposite directions from a certain point on said band and revolubly mounted in said casing and gravity actuating means connected to said indicator for revolving the same.

2. A grade indicator, including a circular casing, a circular indicator provided with a pair of adjacent scales extending in opposite directions from a certain point, gravity actuating means connected to said circular indicator for revolving the same, comprising a pinion positioned inside said indicator and secured thereto, a gear segment pivotally mounted below said pinion in said indicator and adapted to engage the lower side thereof and a weight secured to said gear segment below the pivotal mounting of said gear segment and adapted to revolve said indicator in opposite directions for indicating the inclination of said casing in either direction.

3. A grade indicator, including a casing, a circular member revolubly mounted in said casing, an indicating member adjustably mounted on said circular member and gravity actuating means connected to said revoluble member for revolving the same.

In testimony whereof, I have hereunto set my hand at San Diego, California, this 28th day of June, 1919.

CHARLES C. FORD.